Jan. 1, 1957 R. DALLY 2,776,342

HIGH FIDELITY PHONOGRAPH STYLUS ASSEMBLY

Filed Oct. 25, 1951

Inventor:
Roy Dally,
by Merton D. Morse
His Attorney.

United States Patent Office 2,776,342

Patented Jan. 1, 1957

2,776,342

HIGH FIDELITY PHONOGRAPH STYLUS ASSEMBLY

Roy Dally, Liverpool, N. Y., assignor to General Electric Company, a corporation of New York Application October 25, 1951, Serial No. 253,164

3 Claims. (Cl. 179—100.41)

Figure 1:
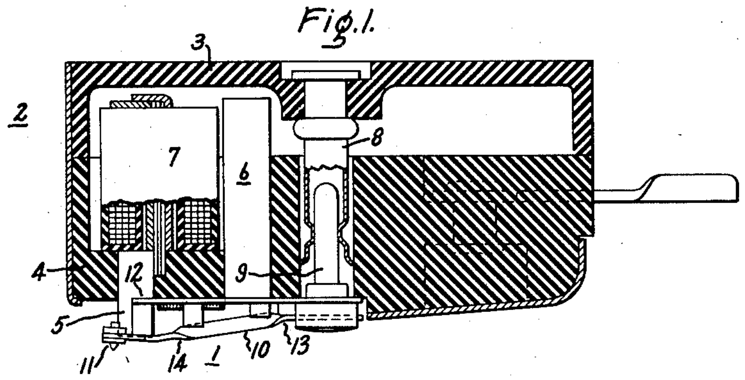

My invention relates to phonograph pickup apparatus, and, more particularly, to magnetic pickup apparatus which employs an elongated cantilever type of stylus support.

Elongated cantilever stylus support members of substantial length are often employed in phonograph pickups because their flexibility enables the stylus to follow faithfully lateral undulations of a record sound groove. To obtain wider-range and higher-fidelity phonograph reproduction, a greater degree of compliance of the phonograph stylus carrier has sometimes been obtained by decreasing the mass and stiffness of the stylus carrier. Distortion may thereby be introduced in the process of attempting to obtain a greater degree of compliance inasmuch as the cantilever support may become resonant as a whole or in part at various vibration frequencies. Damping means have been variously employed in the prior art to stiffen the stylus support against undesired resonant vibrations, but the provision of sufficient damping while maintaining adequate compliance represents a limiting factor in wide-range high-fidelity record reproduction.

It is an object of my invention to provide an improved phonograph stylus assembly having a wide-range high-fidelity response.

It is a further object of my invention to provide an improved damping system for a resilient stylus support which is continuously effective over a wide frequency range.

It is another object of my invention to provide an improved damping system for a magnetic stylus support arm of a variable reluctance pickup head in order to permit movement of the support arm corresponding more faithfully with record groove undulations.

Briefly, in accordance with my invention, I provide in a stylus support assembly a series of at least four spaced resilient damping blocks between a cantilever stylus support and a rigid surface or member of the pickup head. These damping blocks are of a resilient material which dampen resonant vibration of the stylus support arm, the various damping blocks acting singly and together as a system to dampen the resonant vibrations simultaneously caused by the various component frequencies of the stylus movement corresponding to the frequencies of the sound being reproduced.

One stylus assembly to which this invention has a particular embodiment reference as an improvement thereof utilizes a relatively-wide resilient metal ribbon having a pair of spaced quarter twists which define end portions having the wide faces thereof disposed in a horizontal plane and an intermediate portion having a wide face in a vertical plane. Such a stylus support arm is disclosed and claimed in application Serial No. 124,266 of W. W. Ward, filed October 29, 1949, now Patent Number 2,639,156, issued May 19, 1953, and assigned to the assignee of the present invention. In accordance with a preferred form of my invention, four damping blocks are positioned on the stylus support arm between the arm and a reference surface of the pickup head. The first damping block is positioned respectively between the horizontal end portion of the ribbon to which the stylus is secured and the facing portion of the pickup head. The fourth block is positioned between the other flat end portion of the support arm at the fixed end thereof and the pickup head. The second and third damping blocks are compressed between the pickup head and the narrow edge of the intermediate section of the support ribbon between the quarter twists, each block being adjacent one of the twists. The effective length of the vibratory or flexing portion of the support arm may be considered as increasing in distance from the stylus end with a decrease in vibration frequency, the stylus support arm tending to vibrate in the three discrete sections defined between and on either side of the quarter twists. The location of the four damping blocks near the ends of each of the three stylus support arm sections thus provides a substantially continuous damping system over the audio frequency range, damping both vertical and lateral resonant vibrations which tend to arise due to compliance of the support arm with the audio frequency undulations of a phonograph record groove.

Figure 2:
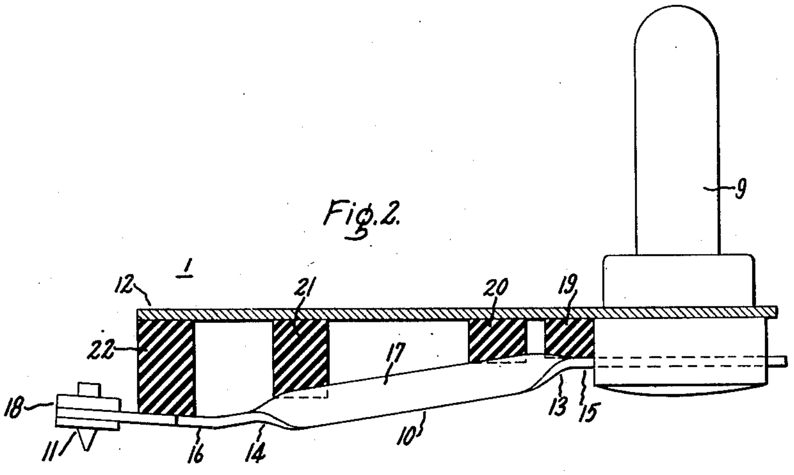
Figure 3:
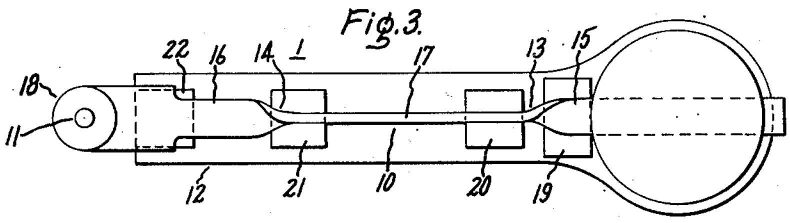

The features of my invention which I believe to be novel are set forth with particularity in the appended claims. My invention itself, however, both as to its organization and method of operation, together with further objects and advantages thereof may best be understood by reference to the following description taken in connection with the accompanying drawing in which Fig. 1 is a sectional side view of a phonograph pickup in which my improved stylus assembly is employed; Fig. 2 is a side view partly in section of the stylus assembly of Fig. 1 showing the assembly in greater detail; and Fig. 3 is a bottom view of the stylus assembly of Fig. 2.

Referring now to Fig. 1 of the drawing, a phonograph stylus assembly is shown constructed in accordance with the principles of my invention and is indicated generally at 1. The stylus assembly is shown in operative position within a phonograph pickup head indicated generally at 2, which is shown as a variable reluctance type magnetic pickup designed to employ a removable stylus assembly.

The phonograph pickup head suitably comprises a pair of inter-fitting molded plastic members 3 and 4 which enclose the electric current generating portions of the pickup. A pair of pole pieces 5, one of which is shown in Fig. 1 of magnetic material are arranged on opposite sides of the free end of the cantilever stylus support arm of the assembly 1 near the stylus so that as the stylus complies laterally with undulations of the grooves of a phonograph record, the flux in an associated magnetic path of the pickup head varies accordingly. A permanent magnet 6 in the pickup head provides the magnetic flux whose path includes a portion of the support arm of the stylus assembly 1, the pole pieces 5, and the magnetic cores of a pair of voltage generating coils 7, each coil being associated with one of the pole pieces 5. One of the coils 7 is shown partially in cross section in Fig. 1. As is pointed out with more detail in U. S. Letters Patent 2,511,663 issued June 13, 1950, to William S. Bachman and assigned to the assignee of the present invention, the net output voltage generated by the coils varies in accordance with the change of flux in their respective cores as caused by the movement of the flux-carrying stylus support arm with respect to the pole pieces.

In the embodiment illustrated, the stylus support assembly is removable, although this particular feature is not essential to my invention. A tubular eyelet 8 is fastened in place in the molded cover member 3 with its lower portion adapted to receive and firmly hold in position a support post or shaft 9 of the stylus assembly. The lower portion of the post is provided with an enlarged end which engages the lower surface of base member 4 of the pickup head. The stylus support arm or beam 10 of the support assembly 1 is soldered or otherwise secured at one end to the lower surface of the enlarged end portion of the post 9.

The other end or free end of the support arm is suitably provided with a record engaging stylus 11. A guide or indexing member 12 is also rigidly fixed to the post 9, being spaced above the stylus support arm 10 and at a small angle to it, the spacing between the arm and guide increasing with distance from the post. The guide 12 is held in position on the lower surface of base member 4 when the post 9 is inserted in the eyelet 8 to thus align or index the stylus and its support arm between the pole pieces 5 of the magnetic pickup head 2.

The post 9, the stylus support arm 10 and the guide 12 comprise a unitary detachable stylus assembly which may be quickly removed and replaced from the pickup head 2. Stylus assemblies of this removable type are further disclosed and claimed in U. S. Letters Patent 2,554,208, issued May 22, 1951, to E. O. Peterson and C. R. Miner and assigned to the assignee of the present invention.

As may be seen, the stylus support arm or beam 10 has its principal axis in a substantially horizontal plane, the supported end being shown slightly higher than the stylus end to prevent contact of the support arm with a record surface. The stylus assembly and pickup head are designed for operation with disc-type records having grooves with lateral undulations, the stylus arm being aligned with respect to the record so that its principal axis is approximately tangent to the groove at the point of stylus contact.

Referring now more particularly to the stylus support assembly 1 shown in detail in Figs. 2 and 3, the stylus support arm or beam 10 is suitably made of a ribbon or reed of resilient magnetic material such as tool steel or the like. This ribbon has a substantial width as compared to the thickness thereof. A ribbon having a thickness of approximately .01" and a width of .03" has been found satisfactory in the embodiment described for either standard or long playing records at tracking pressures of 6 to 8 grams.

In order to minimize "needle talk," or acoustic radiation from the pickup head of vertical vibrations transmitted to it through the stylus support arm 10, and at the same time to allow maximum lateral compliance, a pair of quarter twists 13 and 14 are made in the support arm 10. These twists divide the stylus ribbon into three more or less discrete vibratory sections comprising a section 15 between the support post 9 and the first quarter twist 13 and a section 16 between the second quarter twist 14 and the free end of the support arm, sections 15 and 16 both having the wide face of the ribbon disposed in a horizontal plane and a section 17 between the spaced quarter twists having its wide face disposed in a vertical plane. The stylus 11 is secured to the free end of horizontal section 16 by means of a suitable boss or collar 18 within which the stylus is positioned. Section 16 of the stylus arm is preferably bent slightly upward near the second quarter twist 14 to make the plane of that section more nearly parallel to a horizontal record surface. Both sections 15 and 16 of the support arm, however, have only a small angle to a horizontal plane and thus permit vertical compliance of the stylus. Lateral or horizontal compliance is provided principally by the intermediate vertical section 17 of the support arm, the entire support arm being a single unitary cantilever beam. This double twist stylus support ribbon construction is further disclosed and claimed in the aforesaid application Serial No. 124,266, filed October 29, 1949, by William W. Ward, now Patent Number 2,639,156.

Referring now to the continuous damping system of the stylus support assembly 1, four spaced damping blocks are positioned on the stylus support arm 10 between the support arm and a rigid surface of the pickup head, which surface may advantageously be the previously described guide 12 of the removable pickup assembly. These blocks are made of a resilient material such as soft rubber, either natural or synthetic, for damping undesired vibrations. While rectangular blocks are employed in the illustrated embodiment, it is to be understood that other forms of blocks, such as cylindrical sections, may suitably be employed. The blocks are numbered 19, 20, 21, and 22 in order of their position from the fixed end of the stylus support and are also hereinafter referred to as the first, second, third, and fourth damping blocks.

The first block 19 is cemented between the flat horizontal surface of the support arm section 15 adjacent the support post 9 and the portion of the guide facing it, and is preferably placed in compression, having an uncompressed height slightly greater than the distance between the cantilever arm and the guide. The fourth block 22 is positioned between the horizontal section 16 of the support arm near its free end and the opposing end portion of the guide. The second and third damping blocks, 20 and 21, are compressed between the guide and the intermediate vertically aligned portion 17 of the support ribbon between the quarter twists. These damping blocks, 20 and 21, are respectively positioned adjacent the respective quarter twists with the relatively thin thickness of the stylus ribbon urged against the blocks with sufficient force to cause them to yield along their center line corresponding to the principal axis of the stylus arm.

The damping blocks are dimensioned to provide successively less damping or resistance to vibration in the order of their position from the inner or supported end of the stylus arm 10 to the free end. In the embodiment shown, the height of the respective blocks, i. e., the dimension between the support arm 10 and guide 12, is successively increased with the distance of the blocks from the supported end of the stylus. Resistance to lateral compliance of the free end of the supported arm by the damping means thus decreases with the distance of the blocks from the supported end of the arm. The block length, i. e., the horizontal dimension along the axis of the support arm, may suitably be uniform. Likewise, the width of the blocks, i. e., the horizontal dimension transverse to the principal axis of the support arm is somewhat greater than the width of the ribbon employed as the support arm 10 and is uniform for blocks 20, 21 and 22 as shown in Figure 3, being substantially the same as their horizontal length. To obtain a greater degree of damping, the width of the first block 19 is greater than that of the other blocks as shown in Figure 3, the greater damping being necessary at the support end of the stylus to prevent acoustic radiation. The resilient material utilized in the first damping block 19 may also suitably be of a stiffer material than that of the other blocks so as to further increase resistance to vertical vibration. Since blocks 20 and 21 are in compression, vertical vibration of the arm 10 is also further dampened.

It is obvious, of course, that the dimensions of the damping blocks and the materials employed in them may be variously chosen in order that resistance to lateral vibration by the damping means decreases with the distance of the blocks from the supported end of the stylus arm. Thus, for example, the width and thickness of the blocks may also be successively decreased in the order of the distance of the blocks from the supported end of the stylus arm, although I have found that varying the height of the blocks and, in particular, making the heights of the outermost blocks 21 and 22 greater than the inner blocks 19 and 20 to be particularly effective.

The damping means defined by the four damping blocks in cooperation with the facing surfaces of the pickup head and the stylus support arm operates as a continuous damping system simultaneously to prevent resonant vibrations of the support arm both as a whole and in sections. Thus, regarding the successive damping blocks as employed with a cantilever beam or arm of a generalized type, the effective vibrating length of the support arm increases from the free end of the stylus with decrease in frequency. Of course, due to the usual complex nature of the recorded sound wave, the support arm tends to vibrate simultaneously at a number of frequencies, so that the different damping blocks at any one time may be damping resonant vibrations of different frequencies or combination of frequencies. The damping system as applied to the complex double twist cantilever arm, which is designed to allow sufficient lateral or horizontal compliance while at the same time preventing transmission of vertical vibrations to the pickup head, may be considered to dampen the more or less discrete vibratory portions 15, 16, and 17, of the cantilever arm 10.

The damping blocks, while contributing to the overall operation of the damping system as such, also may be considered as functioning more or less individually. Thus, the first damping block adjacent the support post is particularly effective in preventing acoustic radiation to the pickup head to thus minimize "needletalk." The second and third damping blocks prevent lateral resonances and also dampen and limit vertical compliance of the vertical section 17 of the support ribbon. In addition, a particular high-frequency resonance effect known as groove resonance, which is due to a combination of factors including resonances occurring at the point of stylus contact with the record, is effectively decreased and smoothed by the second damping block in cooperation with the third block. This so-called groove resonance is otherwise particularly noticeable in record discs made of a vinyl resin and often occurs in the neighborhood of 9,000 kilocycles at a 33⅓ R. P. M. record speed. The fourth damping block also helps counteract the torques applied to the stylus which might otherwise twist the support arm with respect to the pole pieces 5 of the pickup head. However, due to the cooperation of the other damping blocks, the fourth damping block functions satisfactorily in this respect without being made so stiff as to inhibit the desired lateral displacement of the stylus.

It will be apparent from the foregoing description that more than four spaced damping blocks may be employed on a cantilever stylus support arm, but at least four spaced damping blocks are believed necessary to provide the continuous damping necessary for best-attainable wide-range high-fidelity operation. While the description relates to what is presently considered to be the preferred embodiment of my invention, it will be obvious to those skilled in the art that various changes and modifications may be made therein without departing from the invention, and it is, therefore, aimed in the appended claims to cover all such changes and modifications as fall within the true spirit and scope of the invention.

What I claim as new and desire to secure by Letters Patent of the United States is:

1. A stylus support assembly comprising a resilient cantilever stylus support arm having one end adapted to be supported on a pickup head, said support arm being arranged to extend along a principal axis spaced from the surface of said pickup head and substantilaly tangent to a phonograph record groove, a rigid mounting member arranged to be supported on said head, said member having a face portion extending alongside said arm, means securing said one end to said member, a phonograph stylus secured to the free other end of said cantilever arm, said stylus being directed in a direction generally opposite from said pickup surface and adapted to follow lateral undulations of said record groove, and a vibration damping system comprising a resilient damping block secured between said face portion and said arm adjacent said free end of said arm, and a plurality of additional resilient damping blocks positioned between said arm and said face portion, all of said blocks being so constructed that their resistance to flexure of said arm increases in the order of their position from said free end of said arm.

2. A high-fidelity stylus support assembly for a phonograph pickup head comprising a relatively-thin, flat, resilient, cantilever ribbon extending generally along a principal axis spaced from said pickup head and having a pair of spaced quarter twists therein arranged to provide two end portions each having a wider face thereof disposed substantially in a first plane through said axis and an intermediate section having a wider face thereof disposed in a second substantially perpendicular plane through said axis, a relatively rigid supporting member arranged to be supported on said head, said member having a face portion extending alongside said ribbon, mounting means for fixedly securing one end of said ribbon to said supporting member, a record-engaging stylus, means securing said stylus to the other end of said ribbon, said stylus extending in the plane of said intermediate section, and a vibration damping system comprising a first vibration damping block positioned between said ribbon and said face portion adjacent said mounting means, a second damping block positioned between the narrower face of said intermediate section and said face portion adjacent the one of said pair of quarter twists nearer to said mounting means and said surface, a third damping block positioned between the narrower face of said intermediate section and said base portion adjacent the other of said pair of quarter twists and said surface, and a fourth vibration damping block positioned near the other end of said ribbon between said ribbon and said face portion, at least said second and third damping blocks being maintained in compression between said ribbon and said supporting member.

3. A high-fidelity stylus assembly for a magnetic pickup head of the reluctance type comprising a relatively-thin, flat, cantilever arm of magnetic material having at least one quarter-twist intermediate its ends providing an end portion lying in a first plane and an intermediate portion lying in a second, mutually-perpedicular plane, a phonograph stylus supported by said end portion, a relatively-rigid supporting member arranged to be supported on said head, said member having a face portion extending alongside said arm opposite one edge of said intermediate portion, means securing the other end of said arm to said member so as to permit flexure of said intermediate section in response to lateral vibration of said stylus in said first plane, a resilient damping block secured between said end portion and said face portion, and a plurality of additional resilient damping blocks positioned in compression between said one edge of said intermediate portion and said face portion, the resistance of said damping blocks to flexure of said arm decreasing in the order of their position from said other end of said arm.

References Cited in the file of this patent

UNITED STATES PATENTS

| | | |
|---|---|---|
| 2,509,356 | Kilgour | May 30, 1950 |
| 2,547,360 | Baker | Apr. 3, 1951 |
| 2,554,209 | Miner et al. | May 22, 1951 |
| 2,565,586 | Bauer | Aug. 28, 1951 |
| 2,639,156 | Ward | May 19, 1953 |